March 10, 1936. L. A. CHAMBERS 2,033,121
MEANS AND METHOD FOR CHURNING BUTTER
Filed Aug. 15, 1934
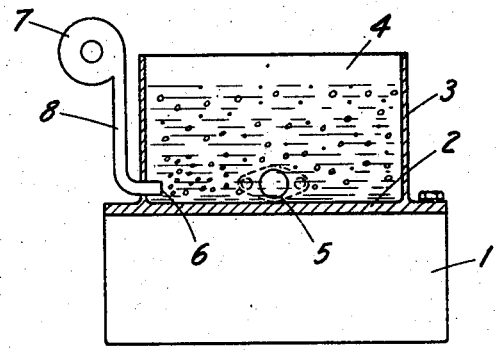
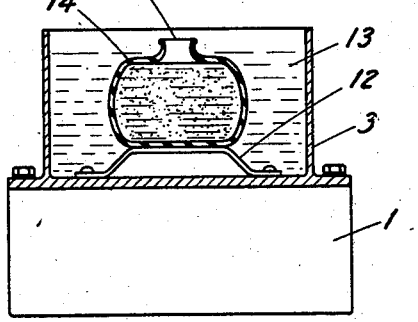
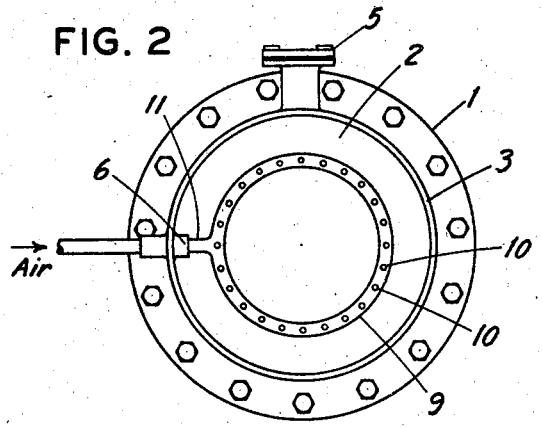
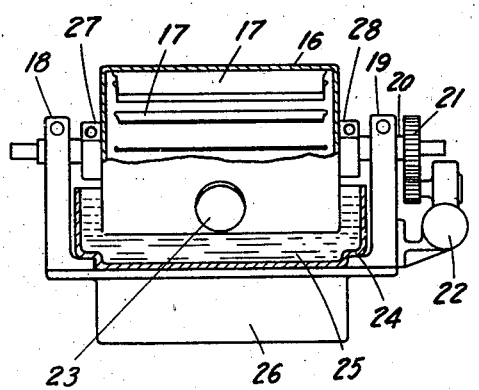
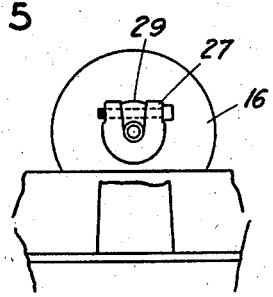
INVENTOR
LESLIE A. CHAMBERS
BY
ATTORNEY Patented Mar. 10, 1936

2,033,121

UNITED STATES PATENT OFFICE 2,033,121

MEANS AND METHOD FOR CHURNING BUTTER

Leslie A. Chambers, Boston, Mass., assignor to William H. Ashton, Edgemont, Pa.

Application August 15, 1934, Serial No. 739,868

11 Claims. (Cl. 31—34)

The present invention relates to the method of obtaining butter from cream and from a mixture of milk and cream such as is ordinarily used in a butter churn in making butter.

In the methods that have been used in the art of making butter it is customary to insert the cream in the drum of a butter churn and churn the butter for a sufficient length of time necessary to gather the butter. This time varies considerably, but under best operations in practice requires about forty-five minutes. The temperature at which the churning operation is accomplished is usually between 52 to 65 degrees Fahrenheit. In most methods of manufacturing butter the cream is slightly soured to an acidity of pH 4 and with this acidity the churning operation is somewhat shortened in time.

It is believed that the fat globules in cream are surrounded by an adsorbed layer of protein, phospholipins, etc., and that these globules appear to carry a negative charge and set up an interfacial tension to keep the globules apart. In the making of butter, therefore, the globules of fat are ultimately brought together by weakening or removing in part or in whole this adsorbed layer and when the adsorbed layer is sufficiently removed, the fat globules coagulate and, in the term of the buttermaker, "the butter gathers".

The churning of the cream in the known process of butter making together with making the cream slightly acid brings about the removal of this layer and causes the sudden break in the cream at which moment in the process the viscosity is suddenly reduced and the fat globules separated, leaving the thin watery liquid which is known as buttermilk in which the particles of butter will float.

In the method according to the present invention sweet cream, which usually takes considerably longer to churn into butter than cream of an acidity of pH 4, may be separated into butter fat and the serum known as buttermilk under normal temperature conditions within about one-third the usual churning time. Not only is the time of churning materially decreased, but also the cost of the apparatus; and the capacity that it will handle is considerably increased. Further than this, the apparatus is easier to care for in that the surfaces with which the cream comes in contact are smooth, may easily be cleaned, maintained clean, and the butter may be readily removed.

According to the method in the present invention the agitation in the cream or liquid is obtained by the use of compressional vibrations in which the liquid is agitated locally, even though it may be stirred quite generally as in the former methods. Compressional vibrations may be of a low frequency just within the range of audible sound or just below it, depending upon conditions and the size of the volume to be treated.

In the present invention vibrations as high as approximately 1000 cycles may be used, but lower frequencies seem to respond substantially as well. The application of compressional waves such as described above is applied with considerable intensity and magnitude so that air is automatically incorporated with the cream, and this, it is believed, provides a great number of small air bubbles or surfaces which themselves gather the adsorbed layer of proteins about the fat globules and therefore allow the fat globules to gather together more easily. The application of vibrational energy also causes a denaturation of the adsorbed layer of proteins about the fat globules which aids in breaking the film probably in the same manner as an increase in acidity. This, it is believed, is perhaps the chief reason for the rapid formation of the butter.

If not sufficient air is incorporated simply by the application of compressional vibrational energy, additional air may be bubbled through the cream while the energy is being applied.

The methods according to the present invention may be carried out in a number of ways, and in the annexed specification and drawing I have illustrated several embodiments of the invention and of the apparatus which forms a part of it.

In the drawing Fig. 1 shows, partly in section, an apparatus for manufacturing butter according to the present invention; Fig. 2 shows a modification of the device shown in Fig. 1; Fig. 3 shows a further modification; Fig. 4 shows still another modification; and Fig. 5 shows a detail of the device shown in Fig. 4.

In Fig. 1 the compressional wave vibrations are obtained by means of a so-called oscillator 1 in which the diaphragm 2 executes rapid vibrations by means of the electrical mechanism within the oscillator 1. The oscillator 1 may be of any of the usual types of electromagnetic or electrodynamic oscillators used in submarine signaling or any other apparatus of this type. Formed over the diaphragm 2 is a container 3 in which the cream 4 may be immersed. An opening 5 may be provided in the container for removing the contents after the operation is completed. If it is desired to charge the cream with air or any other suitable gas, this may be bubbled through the cream by means of the air inlet 6 which may be operated by the air pump 7 connected to the inlet through the pipe 8.

In Fig. 2 there is shown a modification of the system shown in Fig. 1. Here, within the tank 3 a pipe 9 may be provided in which there are holes 10, 10 for air to come through. The pipe 9 may be formed in a ring as indicated and may be attached to the inlet 6 by means of the neck 11. Otherwise, the device according to Fig. 2 is the same as that shown in Fig. 1.

In Fig. 3 the container 3 may be provided with a stand 12, and the container instead of being filled with cream, may be filled with water 13, kept at the desired temperature. The cream to be churned into butter may be inserted in an enclosed vessel 14 which may be provided with a filling vent 15. This container may be placed upon the stand 12 and may be constructed of a yielding material, such as rubber or some composition of rubber, through which the compressional wave vibrations are passed without great loss of energy. In this way the air within the cream is maintained in the container and can not escape.

In Fig. 4 is shown a further modification of carrying out the present invention. Here, the cream is contained in a drum 16 which may be provided with paddles 17 somewhat similar to those used in an ordinary churn. Although it is not necessary to provide the violent churning agitation in any case as is used in the old methods of churning, the paddle 17 may simply move with the motion of a drum and not be separately agitated as in the case of most churns.

The drum may be supported in two bearings 18 and 19 and it may be rotated by rotation of the shaft 20 through the gearing 21 by means of the motor 22. The drum may also be provided with a filling opening 23 through which the cream can be poured and the butter removed. The lower part of the drum is immersed in the vessel 24 which contains water 25 or other suitable liquid. At the bottom of the vessel 24 there is provided an oscillator 26 for producing compressional waves in the vessel and within the drum. The drum 16 may be removable by making the plates 27 and 28 in the shape of a sector as shown in Fig. 5 and putting a wedge-like element 29 on the side face of the drum so that the drum may be removed when the butter has been churned and a new drum inserted.

In the operation of the present invention and in the use of apparatus described above, the cream or mixture of cream and milk from which the butter is to be made is placed in the container and the compressional vibrations are supplied by means of the oscillator. The magnitude of such vibrations should be such as to produce cavitation of the cream or agitation near the point of cavitation. This application of vibrational energy should be continued until the butter has formed, after which it can be drawn off in the usual methods.

In my experience butter will usually form within twelve to fifteen minutes with the use of sweet cream and approximately the same time will be required with a slight acidity of the cream. This is at ordinary churning temperatures from 52 to 65 degrees Fahrenheit.

If not sufficient air is incorporated into the operation by the application of the vibrational energy from the diaphragm itself, additional air may be applied by bubbling through the cream an air stream as has been described above. This air stream may be bubbled continuously through the cream from the beginning of the operation or it may be used at times during the operation, as might be considered necessary.

Various modifications of the apparatus described above and of the methods according to the present invention may be made without departing from the general method described and these it will be understood are included in the present invention.

Having now described my invention, I claim:

1. A method of obtaining butter from cream which comprises applying compressional wave vibrations of an audio frequency to the cream and simultaneously therewith charging the cream with air.

2. A method of obtaining butter from cream which comprises applying compressional wave vibrations of a frequency within the audio range to the cream and bubbling air at the same time through the cream.

3. A method of obtaining butter from cream which comprises applying compressional vibrations at the lower side of a container containing the cream and simultaneously therewith bubbling air through the cream from the lower part of the container.

4. A device for making butter from cream comprising a container adapted to hold the cream, a source of compressional wave vibrations applied to a portion of said container, and means for supplying air to the container within the space normally occupied by the cream.

5. A device for making butter from cream comprising a container adapted to hold the cream having a bottom surface formed as a compressional wave source and means entering said container at the lower portion thereof for supplying and bubbling air through the cream in the container.

6. A device for making butter from cream comprising a container adapted to hold a liquid medium, a source of compressional wave vibrations applied to said container, a second enclosed container adapted to hold the cream positioned to come in contact with the liquid medium and means for agitating the cream within the second container.

7. A method of obtaining butter from cream comprising placing the cream in an enclosed container, immersing said container in a liquid medium and applying compressional wave vibrations thereto.

8. A device for making butter from cream comprising a drum adapted to hold the cream, a vessel adapted to hold a liquid medium, means for supporting said drum to have at least a portion thereof come in contact with the liquid medium, means for rotating said drum and means for supplying compressional wave vibrations to the liquid contained in said vessel.

9. A device for making butter from cream comprising a drum adapted to hold the cream, a vessel adapted to hold a liquid medium, means for supporting said drum to have at least a portion thereof come in contact with the liquid medium, means for rotating said drum, means contained within the drum for agitating the cream when the drum is rotated and means for supplying compressional wave vibrations to the liquid contained in said vessel.

10. A method of obtaining butter from cream which comprises placing the cream in a yielding container, immersing said container in a liquid medium and applying compressional wave vibrations to said medium.

11. A device for making butter from cream including a container adapted to contain liquid, a yielding container positioned in said first container and adapted to contain the cream from which butter is to be made and means for applying compressional vibrations to said container.

LESLIE A. CHAMBERS.